Dec. 8, 1959    N. R. DE WITT    2,916,169
PALLET CONVEYOR FOR A TRAILER
Filed Jan. 22, 1957    2 Sheets-Sheet 2
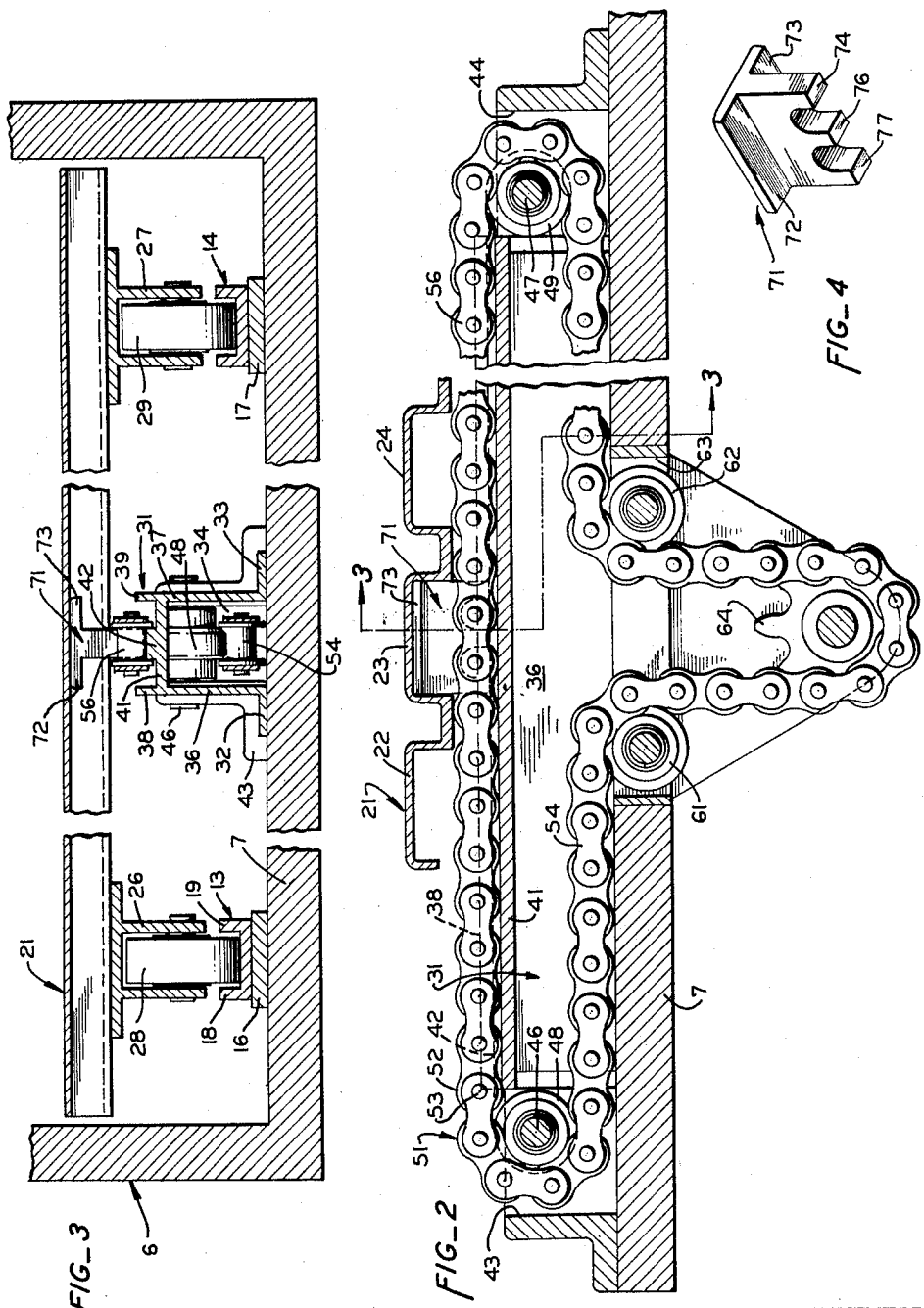
INVENTOR.
NICKLAS R. DEWITT
BY Lothrop & West
ATTORNEYS

United States Patent Office 2,916,169
Patented Dec. 8, 1959

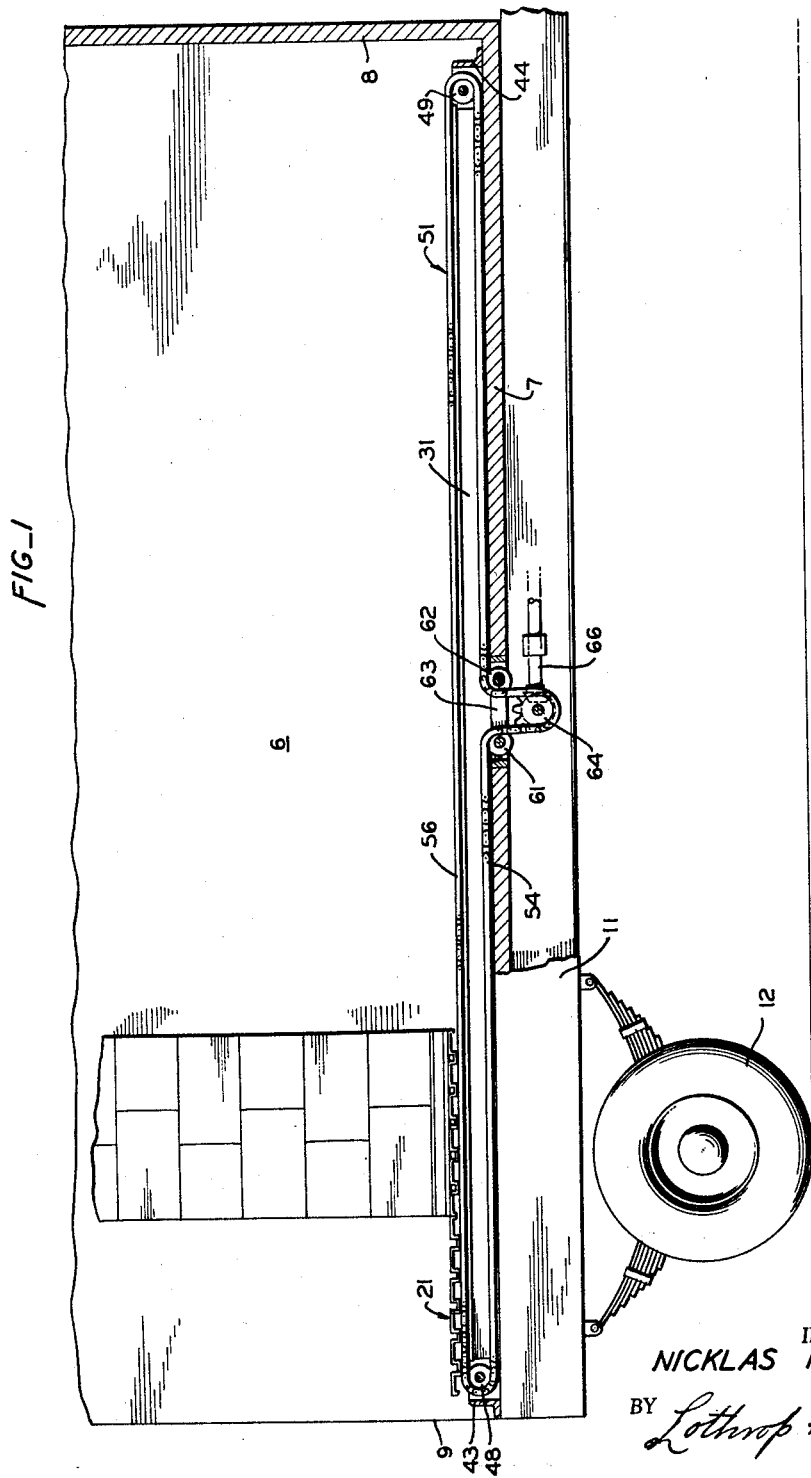

2,916,169

PALLET CONVEYOR FOR A TRAILER

Nicklas R. De Witt, Medford, Oreg.

Application January 22, 1957, Serial No. 635,482

4 Claims. (Cl. 214—83.36)

My invention relates generally to the subject matter disclosed in my co-pending application entitled Vehicle Load Handler, Serial No. 520,431, filed July 7, 1955, and is especially concerned with an improved version of the structure and one which is capable of economical and extended practical use under various severe loading conditions.

The invention also relates to a pallet conveyor for use in moving palletized goods over a floor in any environment whether in a trailer, truck or even a warehouse.

It is an object of the invention to provide a pallet conveyor which is readily fabricated substantially as a package unit so that it can be easily installed on a selected floor, particularly a trailer floor.

Another object of the invention is to provide a pallet conveyor of greatly simplified design and relatively light weight so that when used in a truck or trailer it does not impose a serious weight penalty upon the user.

Another object of the invention is to provide a pallet conveyor which will operate satisfactorily in its intended path despite eccentric loading and irregularly loaded pallets.

Another object of the invention is to provide a pallet conveyor made largely of light material such as aluminum but in which the wear is arranged to occur on the parts which have relatively a long life.

Another object of the invention is to provide a pallet conveyor having a motive unit so that the drive to the pallet conveyor can extend through a relatively small opening in the trailer floor, particularly in the case of refrigerated trailers.

Other objects, together with the foregoing, are attained in the embodiment of the invention described in the accompanying description and illustrated in the accompanying drawings in which:

Figure 1 is a cross section on a longitudinal vertical plane through a trailer in which the pallet conveyor of the invention is incorporated.

Figure 2 is a view to an enlarged scale of part of the structure shown in Figure 1.

Figure 3 is a cross section the planes of which are indicated by the line 3—3 of Figure 2.

Figure 4 is an isometric view of a chain-engaging member.

While the pallet conveyor of the invention can be embodied in a number of different forms and can readily be installed wherever palletized materials are to be moved, it has met with commercial success when incorporated with a trailer and is, for example only, so described herein.

The installation is usually made in a trailer of a substantially standard kind including a box body 6 in addition to the usual sides and roof having a floor 7, an end wall 8 and a loading end 9 all arranged on a suitable frame 11 mounted on ground engaging wheels 12. The floor 7 is usually supported upon the top of the frame 11 and is a planar rectangular structure. The body 6 is sometimes inclusive of insulating material, particularly in the case of a refrigerator trailer.

Pursuant to the invention, the floor 7 is preferably provided between its sides with a pair of longitudinally extending parallel channel rails 13 and 14. These elements are conveniently of U-shape in cross section and for lightness are conveniently fabricated of an aluminum extrusion. They are disposed on the floor 7 with intermediate supports 16 and 17, if desired, for establishing the proper height. The channel rails are located so that their side flanges 18 and 19 are pointed upwardly and so as to serve as close confining walls to avoid lateral displacement.

Overlying the channel rails is a pallet 21. This conveniently is a generally planar structure extending for substantially the full width of the trailer (although two units each of half width can be used, if desired) and is conveniently formed of any suitable material. Plywood is often used. Satisfactory also is aluminum material having transversely extending corrugations 22, 23, 24 and the like repeated for the desired depth of the pallet. There is thus afforded a light weight member having a substantially planar surface, so far as superimposed lading is concerned, yet one which, by reason of the depth of its corrugations, is relatively stiff and strong.

At appropriate points at opposite sides of the center line there are secured beneath the pallet 21 brackets 26 and 27 serving as mounts for load bearing wheels 28 and 29. Customarily, a single pallet has at least four wheels although more can be employed in the event the loads are extremely heavy. The wheels 28 and 29 are closely confined within the bracket 26 and are nearly of the same width as the distance between the upstanding flanges 18 and 19 of the channel rails so that the pallet 21 is accurately positioned laterally of the body 6 when the wheels 28 and 29 are within the channel rails.

Located on the floor 7 between the channel rails 13 and 14 and extending longitudinally of the floor parallel to such rails is a central hollow box guide 31. This likewise conveniently is an aluminum extrusion. It is provided with a pair of outstanding flanges 32 and 33 for securing the box guide to the upper surface of the floor 7 and thus to provide a longitudinally extending enclosure 34. The sides 36 and 37 of the guide are extended upwardly to terminate in longitudinally extending flanges 38 and 39. Between the sides 36 and 37 the guide is provided with a top wall 41. Centrally of the top wall there is an upstanding rib 42 disposed substantially along the longitudinal center line of the trailer.

At its opposite ends the hollow box guide is secured to terminal fittings 43 and 44 acting as end anchors to the trailer floor for the mechanism. The fittings 43 and 44 likewise serve as journal supports for the shafts 46 and 47 of a pair of rollers 48 and 49. The rollers may be but are not necessarily sprockets and are made of slightly yielding, composition material readily to support a conveyor chain 51. This chain is of the usual type including links 52 and plain or roller pins 53. It is arranged with its lower run 54 extending through the enclosure 34 defined by the hollow box guide and with its upper run 56 extending along the top of the hollow box guide between the flanges 38 and 39. The pins 53 of the chain run substantially on the rib 42 whereas the links 52 depend slightly on the opposite sides of the rib.

In order to advance the conveyor chain with respect to the remaining structure, the lower run 54 is guided around rollers 61 and 62 suitably journalled in the floor 7 of the trailer with the chain portions passing through a relatively narrow and short opening 63. The opening is made as small as possible so that the circulation or movement of air therethrough is very slight. Thus, the presence of the opening does not materially affect the refrigerating qualities of the trailer body.

The chain is led around a drive sprocket 64 disposed beneath the trailer on the frame 11. The sprocket 64 is connected by suitable mechanism 66 to any suitable power driving arrangement. This usually is a reversible presence of the opening does not materially affect the electric motor served from the storage battery on the vehicle which pulls the trailer.

Centrally disposed on the underside of the pallet 21 and conveniently nested in one of the transverse corrugations 23 thereof is a tooth block 71. This has outstanding flanges 72 and 73 at its upper end to afford adequate fastening means and at its lower end has a plurality of teeth 74, 76 and 77. These are of a size to fit snugly but freely over and between the successive pins 53 of the upper run of the chain and to be disposed with reasonable clearance between the links 52 forming the chain. The block 71 is conveniently of a good wearing material such as bronze and depends so that its lower surface (or the lower tooth surfaces) normally and when the pallet is unloaded is just above the upper surface of the rib 42 and has a normal running clearance therewith.

In the operation of this device, a pallet 21 is disposed above the floor of the trailer with the rollers 28 and 29 in load bearing relationship within the guide rails 13 and 14 and with the block 71 in engagement with the upper run of the chain. When the driving means is energized appropriately, the upper run of the chain is advanced so that the pallet engaged therewith by means of the block 71 is advanced over the floor of the trailer. As the pallet achieves a position spaced from the loading end 9, another similar pallet is deposited with its roller wheels within the channel guides and with its depending tooth block in engagement with the upper run of the chain. This process is followed until the entire trailer floor is overlain by pallets. These pallets can be without load or can be laden. In the latter instance, sometimes the load is sufficiently heavy as to cause a central, downward deflection of the pallets. When that occurs additional support is provided, as the tooth block 71 is also lowered into contact with the rib 42. The block then slides on the upper surface of the rib 42 and bears a share of the load.

When the trailer is to be unloaded, the reverse operation of the mechanism takes place. The pallets are readily disengaged from the roller guides 13 and 14 and from the conveyor chain. The pallets can then be stacked separately within the vehicle body. Alternatively, and if desired, the pallets can be left on the floor in engaged relationship. If so, they are kept from shifting laterally by the upstanding flanges 18 and 19 and possibly, 38 and 39.

The chain commercially available is usually made of relatively hard material such as steel. This tends to cut extruded aluminum. The rib 42 in engagement with the pins of the chain holds the side links of the chain out of cutting engagement with the central box guide. Parts of the chain away from the block 71, which tends to centralize the chain, may tend during motion of the vehicle to be dislodged laterally. The flanges 38 and 39 insure that the chain does not depart far from its proper course.

With this mechanism therefore there is provided a pallet conveyor for trailers effective to handle relatively light but strong and well guided pallets throughout the length of the trailer whether loaded or unloaded. The parts are confined to their proper positions under all conditions and despite lurching and shifting of the vehicle itself. Although many of the parts are made of extremely light and relatively soft material, the arrangement is such that other hard materials, such as those of the chain, do not produce cutting or gouging of the surrounding soft material. In addition, the chain is let out of the body of the trailer through a relatively small opening so that the power source is outside of the load compartment yet so that there is negligible air flow. The result of the invention is a substantially improved and highly practical pallet conveyor for a trailer.

What is claimed is:

1. A pallet conveyor for a trailer having a floor comprising a pair of parallel load supporting channel rails extending longitudinally of said trailer floor, a guide extending longitudinally of said trailer floor between said channel rails, said guide having a central upstanding rib and a pair of side flanges, a pair of rollers, means for journalling said rollers at the opposite ends of said guide with said rollers substantially tangent to said rib, a chain trained around said rollers and having its upper run engaging said rib and confined between said flanges, mean for advancing said chain along said guide, a pallet overlying said channel rails and said guide, load supporting wheels on said pallet disposed to run in and transfer load to said channel rails, and a toothed block depending from said pallet in registry with and displaceable to transfer load to said rib and interengaging with the pins of said upper run of said chain when said wheels are in said channel rails.

2. A pallet conveyor for a trailer having a floor comprising a pair of parallel rails extending longitudinally of said trailer floor, a pallet overlying said rails, load-supporting wheels on said pallet disposed to engage said rails and transfer load thereto, a hollow box guide extending longitudinally of said trailer floor parallel to and between said rails, said box guide having an upper surface, a pair of rollers, means for journalling said rollers at the opposite ends of said box guide, a chain trained around said rollers and having its lower run extending through said hollow box guide above said floor and having its upper run disposed just beneath said pallet and running on said upper surface of said box guide, means for advancing said chain, and a toothed block depending from said pallet to engage with the pins of said upper run of said chain and to engage with said upper surface when said pallet is deflected under load.

3. A pallet conveyor for use with a floor comprising a pair of parallel channel rails extending along said floor, a pallet overlying said channel rails, load-supporting wheels on said pallet disposed to engage said rails and transfer load thereto, a guide on said floor and extending parallel to and between said rails, said guide having a longitudinal rib upstanding from the top thereof, a pair of rollers, means for journalling said rollers at the opposite ends of said guide, a chain trained around said rollers and having its upper run disposed just beneath said pallet and engaging said rib, means for advancing said chain along said guide, and a toothed block depending from said pallet to engage with the pins of said upper run of said chain and substantially into load supporting sliding contact with said rib.

4. A pallet conveyor for use with a floor comprising a pair of parallel channel rails extending along said floor and projecting upwardly therefrom, a pallet overlying said channel rails, load-supporting wheels depending from said pallet and disposed to engage said rails in load-supporting relationship, a guide extending parallel to said rails and upstanding from said floor between said rails, said guide having a longitudinal rib upstanding from the top thereof, a pair of rollers, means for journalling said rollers at the opposite ends of said guide, a link chain trained around said rollers and having its upper run sliding along said rib just beneath said pallet, means for advancing said chain along said guide, and a block secured to and depending from said pallet between said wheels and substantially into load-supporting and sliding engagement with said rib, said block having vertical clearance with said upper run and having a portion extending between the links of said upper run of said chain.

References Cited in the file of this patent

UNITED STATES PATENTS

| 1,410,935 | Lazareth | Mar. 28, 1922 |
| 2,442,549 | Pearlman | June 1, 1948 |
| 2,602,196 | Pelton | July 8, 1952 |